April 25, 1967  J. L. WOODLEY, JR  3,315,530
FIBER SAMPLING APPARATUS
Filed April 12, 1965  3 Sheets-Sheet 1
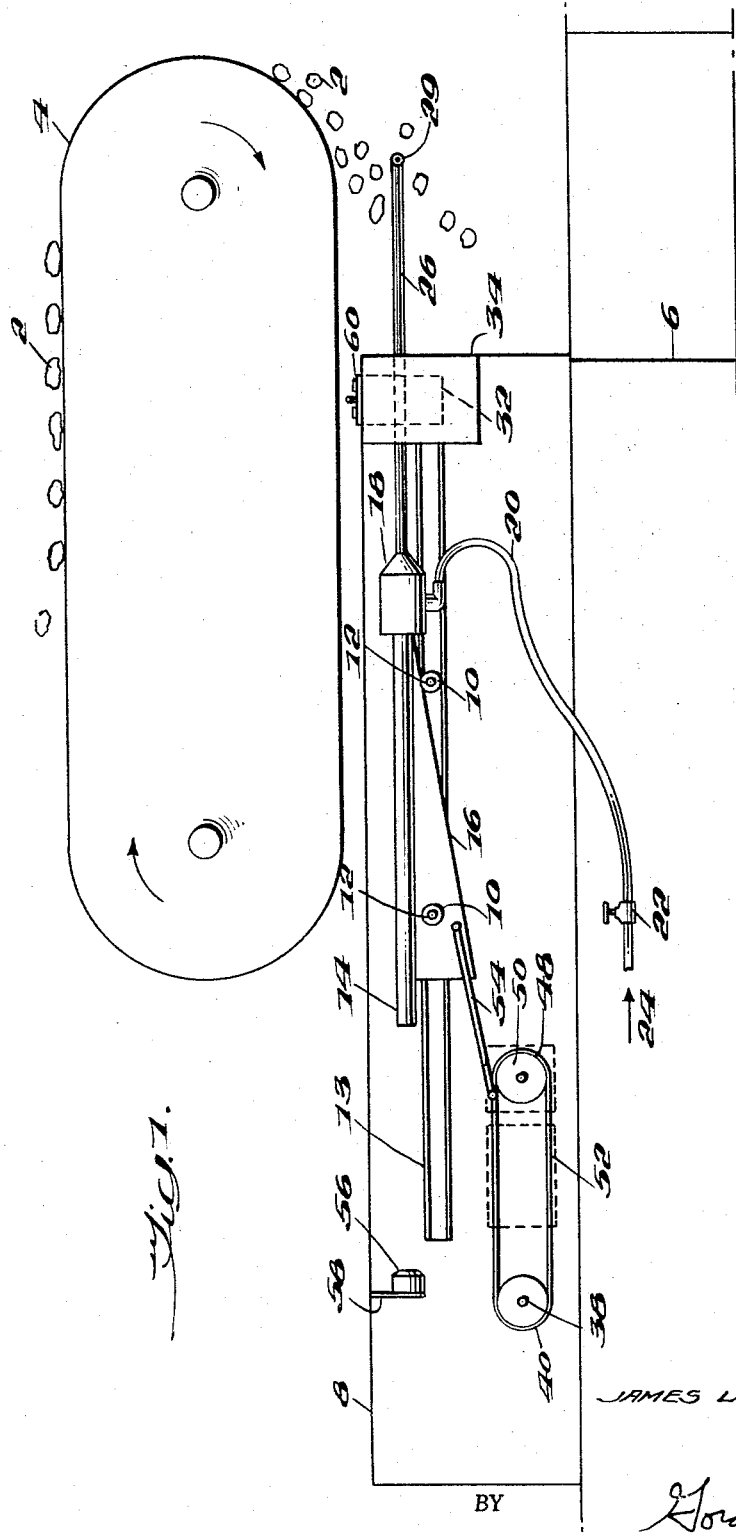
INVENTOR
JAMES LAMAR WOODLEY, JR.
BY Gordon R. Coons
AGENT April 25, 1967 J. L. WOODLEY, JR 3,315,530
FIBER SAMPLING APPARATUS
Filed April 12, 1965 3 Sheets-Sheet 2
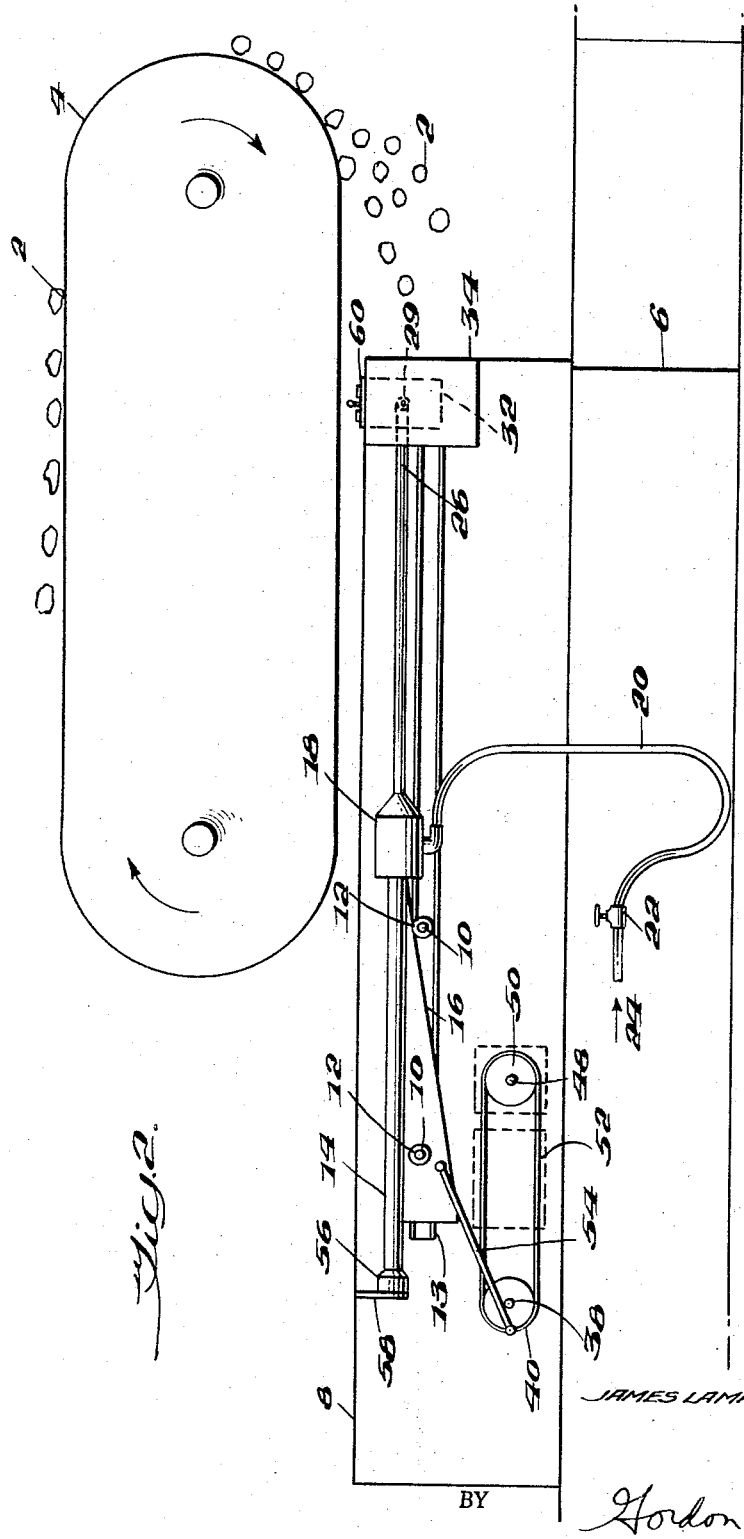
INVENTOR
JAMES LAMAR WOODLEY, JR.
BY Gordon K. Coons
AGENT

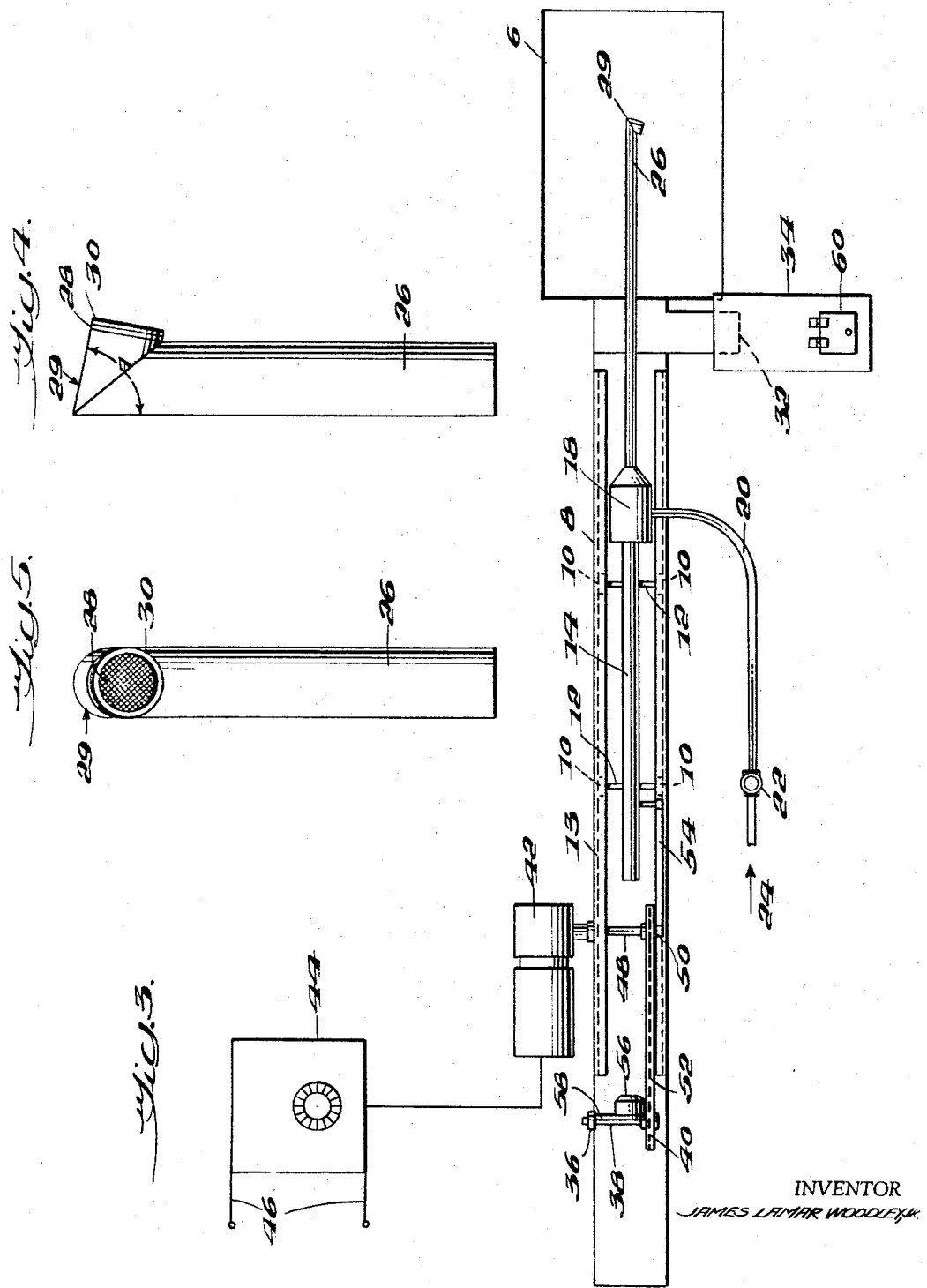

FIBER SAMPLING APPARATUS

James Lamar Woodley, Jr., Kinston, N.C., assignor to E. I. du Pont de Nemours and Company, Wilmington, Del., a corporation of Delaware
Filed Apr. 12, 1965, Ser. No. 447,235
2 Claims. (Cl. 73—423)

This invention relates to sampling devices and, more particularly, to an apparatus adapted to periodically take samples of suspended materials such as staple fibers within a gaseous or vaporous fluid medium. This apparatus is particularly applicable to the textile industry.

An object of this invention is to provide a sampling apparatus for automatically taking samples at definite intervals to provide a representative sample of the material. Another object is to provide a sampling apparatus wherein the sampling intervals can be varied over a wide range. A further object is to provide a sampling apparatus wherein the sample collected will be completely displaced into a collection box leaving no residue on the sampler. Other objects will appear hereinafter.

The objects of this invention are accomplished by providing an automatic sampling device which comprises a housing adjacent the stream to be sampled, a hollow probe reciprocally mounted in the housing, the hollow probe having one end open and the other terminating in a probe tip which culminates in a circular section having a fluid pervious screen attached thereto, the axis of the probe tip having an included angle with the axis of the hollow probe of from 80° to 90°, a sample collection box adjacent the housing, a bumper mounted in the housing in the path of the hollow probe, reciprocating means to move the hollow probe into the stream and back to the bumper at a variable, predetermined rate and means to supply air to the hollow probe whereby the air supply creates a vacuum in the probe tip to attract a sample which vacuum turns into a positive pressure to blow the sample into the collection box when the open end of the hollow probe contacts the bumper. In the preferred embodiment, a transfer tube connects the housing and the sample collection box.

The embodiments of this invention and their advantages can be more readily understood by referring to the accompanying drawings.

FIGURE 1 is an elevation view in diagrammatic form showing one embodiment of this invention with the probe extended to obtain a sample of staple fiber.

FIGURE 2 is a diagrammatic elevation view showing the probe retracted.

FIGURE 3 is a plane view of FIGURE 1.

FIGURES 4 and 5 are enlarged views of the sampling probe tip.

With respect to FIGURES 1 and 2, there is shown the automatic sampling device of this invention installed in a staple fiber conveying system such as used in the textile industry for taking staple fibers from a cutter to a packaging system such as a baler. Staple fibers 2 proceed along an endless belt 4 from which the fibers are discharged downwardly to the supply chute 6 of a baler or other receiving means. In order to take a representative sample from the fiber stream as it proceeds to the baler, housing 8 is preferably disposed in a horizontal position adjacent to chute 6 and perpendicular to the axis of the chute though it may be inclined if so desired. Within housing 8 there is provided a hollow probe 26, which has one end open and the other terminates in a probe tip 29 which is covered by a screen 28 held in place by a ring 30 fastened to probe tip 29 as shown in FIGURE 4. The probe is connected to a reed or aspirating valve 18. An air supply, not shown, provides compressed air as indicated at 24 through valve 22 and hose 20 to reed valve 18. An exhaust pipe 14 is connected to valve 18 to discharge both supply air and air evacuated from hollow probe 26. A gusset 16 is fastened in the vertical plane to the bottom of exhaust pipe 14. A pair of parallel shafts 12 are attached perpendicular to the gusset with bearings 10 mounted to each end of the shafts. The gusset, shafts and bearings serve as a carriage for hollow probe 26, valve 18 and exhaust pipe 14 assembly. Bearings 10 engage parallel tracks 13 which are fastened to opposite sides of housing 8 so that the probe assembly can be reciprocated parallel to the axis of the housing.

As shown in FIGURE 3, means are provided for reciprocating hollow probe 26 so that it extends into the material stream and retracts into housing 8. Such means may take the form of a motor driven gear reducer 42 mounted to the side of housing 8. A conventional speed control unit 44 is connected between supply voltage 46 and drive 42. A sprocket 50 is driven by drive 42 through shaft 48. A shaft 38 is rotatably mounted to the side of housing 8 in a conventional manner by means of bearing 36 with sprocket 40 attached to the end of shaft 38. An endless roller chain 52 is engaged between sprockets 40 and 50. An arm 54, commonly known as a slave link, is pivotally connected to endless roller chain 52 and to gusset 16. A transfer tube 32 is connected between housing 8 and sample collection box 34 so that when probe 26 is retracted in housing 8 the probe screen 28 is in alignment with chute 32. An access door 60 is provided in the top of sample collection box 34. A rubber bumper 56 is mounted to plate 58 which is attached to housing 8. The bumper is in axial alignment with the open end of exhaust pipe 14 and is so located and sized as to close off the exhaust pipe which the probe is fully retracted.

With respect to FIGURES 4 and 5, there are shown two views of probe tip 29. Probe tip 29 is covered by fluid pervious screen 28 held in place by ring 30 which is fastened to probe tip 29. The included angle A between the axis of probe tip 29 and the axis of hollow probe 26 should be in the range of from 80° to 90° to provide optimum air flow through screen 28 when blowing the sample from the screen to insure complete removal of the sample from the screen.

The operation is described hereinafter. Rotary motion imparted to sprocket 50 by drive 42 through shaft 48 is translated to a reciprocating linear motion of arm 54 as the arm connected to a fixed point on roller chain 52 travels around the endless path between sprockets 40 and 50. The reciprocating motion of arm 54 is transmitted to the assembly of gusset 16, exhaust pipe 14, valve 18, and hollow probe 26. In this manner hollow probe 26 is alternately extended into the material stream to collect a sample and retracted into housing 8 to discharge the sample. The frequency of the strokes can be varied by controlling the speed of drive unit 42 by means of speed control unit 44. As probe 26 is extended a suction is created at probe tip 29 by the flow of air 24 through hose 20, reed valve 18 and exhaust pipe 14. Reed valve 18 is an aspirating valve which operates in accordance with Bernoulli's Theorem to reduce the pressure in hollow probe 26 thus creating a suction in probe tip 29. The suction collects and holds a sample of staple fibers 2 on screen 28 of hollow probe 26. When the probe is fully retracted, the hollow end of exhaust pipe 14 is closed off by rubber bumper 56. With the exhaust cut off the air flow is exhausted through hollow probe 26, probe tip 29 and out screen 28, thus blowing the retained sample through transfer chute 32 into sample collection box 34. Samples collected may be removed at any desired interval by utilizing door 60.

The automatic sampling device of this invention provides a useful device for obtaining a representative sample of staple fiber which can then be subjected to various physical and mechanical quality tests. For the use hereinbefore illustrated, it has been found that from about 1 to about 26 samples per minute are required to provide an optimum sampling frequency. Such a variation in the frequency of sampling can be easily accomplished by varying the speed of the drive.

Although air has been illustrated as the medium to create the vacuum in the probe tip, it should be obvious that any gas which is inert to the staple fibers and to the materials used in the automatic sampling device could be likewise advantageously used. Similarly, any positive mechanical or electrical drive could be utilized in place of the one herein described as long as the rate of the resulting reciprocatory motion of the hollow probe can be widely varied and the operation is substantially independent of air pressure. Moreover, the automatic sampling device of this invention is not limited to the sampling of staple fibers; suspensions of other materials such as plastic fillers and granular foods can be collected in the manner described.

Since many different embodiments may be made without departing from the spirit and scope of this invention, it is understood that the invention is not limited to this specific illustration except as defined in the appended claims.

What is claimed is:

1. An automatic sampling device for obtaining periodic samples from a stream of fluid material which comprises a housing adjacent said stream, a hollow probe reciprocally mounted in said housing, said hollow probe having one end open and the other terminating in a probe tip which culminates in a circular section having a fluid pervious screen attached thereto, said probe tip having an included angle with the axis of said hollow probe in the range of from 80° to 90°, a sample collection box adjacent said housing, a bumper mounted in said housing in the path of said hollow probe, reciprocating means to move said hollow probe into said stream and back to said bumper at a variable, predetermined rate and means to supply air to said hollow probe whereby the air supply creates a vacuum in said probe tip to attract a sample which vacuum turns into a positive pressure to blow said sample from said probe tip into said sample collection box when the open end of said hollow probe contacts said bumper.

2. An automatic sampling device for obtaining periodic samples from a stream of fluid material which comprises a housing adjacent said stream, a hollow probe reciprocally mounted in said housing, said hollow probe having one end open and the other terminating in a probe tip which culminates in a circular section having a fluid pervious screen attached thereto, said probe tip having an included angle with the axis of said hollow probe in the range of from 80° to 90°, a sample collection box adjacent said housing, a transfer tube connecting said housing to said sample collection box, a bumper mounted in said housing in the path of said hollow probe, reciprocating means to move said hollow probe into said stream and back to said bumper at a variable, predetermined rate and means to supply air to said hollow probe whereby the air supply creates a vacuum in said probe tip to attract a sample which vacuum turns into a positive pressure to blow said sample from said probe tip through said transfer tube into said sample collection box when the open end of said hollow probe contacts said bumper.

No references cited.

LOUIS R. PRINCE, *Primary Examiner.*

S. C. SWISHER, *Assistant Examiner.*